United States Patent [19]

Ojima et al.

[11] Patent Number: 4,672,593
[45] Date of Patent: Jun. 9, 1987

[54] OPTICAL HEAD WITH IMPROVED EXTINCTION RATIO FOR MAGNETO-OPTICAL MEMORY

[75] Inventors: Masahiro Ojima, Tokyo; Atsushi Saito, Ichikawa; Tsuyoshi Kato, Hachioji, all of Japan

[73] Assignee: Hitachi, Ltd., Tokyo, Japan

[21] Appl. No.: 750,476

[22] Filed: Jul. 1, 1985

[30] Foreign Application Priority Data

Jun. 29, 1984 [JP] Japan .................. 59-133162
Oct. 11, 1984 [JP] Japan .................. 59-211318

[51] Int. Cl.$^4$ ............ G11B 11/00; G11B 7/00
[52] U.S. Cl. ................... 369/13; 369/110; 369/112; 360/114; 365/122
[58] Field of Search ............ 369/110, 112, 46, 13; 360/114; 365/122

[56] References Cited

U.S. PATENT DOCUMENTS

| | | |
|---|---|---|
| 4,451,863 | 5/1984 | Yanagida et al. ........... 369/112 X |
| 4,532,619 | 7/1985 | Sugiyama et al. ........... 369/110 X |
| 4,558,440 | 12/1985 | Tomita ................... 369/110 X |
| 4,561,032 | 12/1985 | Matsumoto et al. ........... 360/114 |
| 4,569,035 | 2/1986 | Tomita ................... 365/122 |
| 4,571,650 | 2/1986 | Ojima et al. ............. 369/13 |
| 4,573,149 | 2/1986 | Deguchi et al. ........... 369/43 X |

*Primary Examiner*—Aristotelis M. Psitos
*Attorney, Agent, or Firm*—Antonelli, Terry & Wands

[57] ABSTRACT

An optical head for a magneto-optical memory in which the major axis (the phase advance axis or phase lag axis) of optical anisotropy of a lens focusing a linearly polarized laser beam onto a magneto-optical recording medium is arranged to coincide with the direction of linear polarization of the laser beam incident upon the lens, thereby improving the extinction ratio.

10 Claims, 9 Drawing Figures

OPTICAL HEAD WITH IMPROVED EXTINCTION RATIO FOR MAGNETO-OPTICAL MEMORY

BACKGROUND OF THE INVENTION

This invention relates an optical head for a magneto-optical memory, and more particularly to an optical head which detects, with a high sensitivity, the direction of polarization rotating through a very small angle in a relation corresponding to the direction of magnetization of a perpendicular magnetic thin film, so that information recorded on the perpendicular magnetic thin film can be reproduced with a high S/N ratio.

A magneto-optical disc memory is known as one of erasable (rewritable) optical information recording apparatus. An apparatus of this kind is described in, for example, N. Inamura and C. Ota; Japan J. Appl. Phys. 19 (1980) L731. According to the reported apparatus, information can be easily recorded and erased since the apparatus utilizes the light-induced thermo-magnetic effect. However, the reported apparatus, in which rotation, less than 1 degree, of the direction of polarization due to the magnetization is detected for reproducing recorded information, has had such a demerit that the quantity of reproduced signal light is very small, resulting in a low S/N ratio.

SUMMARY OF THE INVENTION

It is a primary object of the present invention to provide an optical head from which information recorded on a perpendicular magnetic thin film by magnetization can be reproduced with a high S/N ratio by directing a laser beam thereto.

In a magneto-optical information recording and reproducing apparatus such as a magneto-optical disc memory, its optical head must show a high extincition ratio so that slight rotation of the direction of polarization can be detected with a high sensitivity. The present invention is based on the finding of the relation between the optical anisotropy of a convergent lens (focusing lens) focusing a laser beam onto a magneto-optical recording medium (a perpendicular magnetic thin film) and the extinction ratio of an optical head and is featured by the fact that coincidence is attained between the major axis (the phase advance axis or phase lag axis) of optical anisotropy of the lens and the direction of linear polarization of the laser beam incident upon the lens, thereby improving the extincition ratio of the optical head.

DESCRIPTION OF THE PREFERRED EMBODIMENTS

Figure 1:
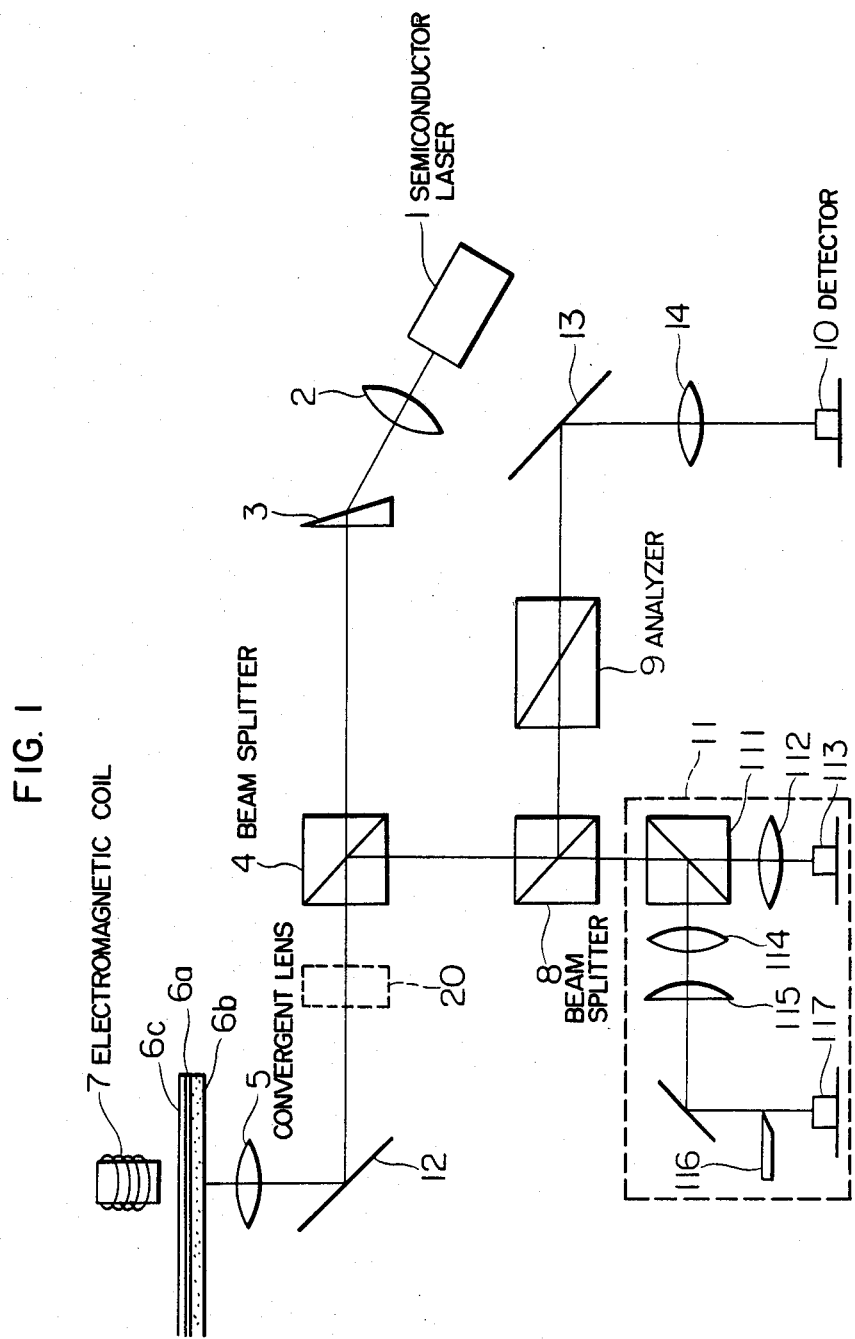
FIG. 1 is a systematic diagram showing the structure of an embodiment of the optical head according to the present invention.

FIG. 1 shows the structure of an embodiment of the optical head for a magneto-optical disc memory, according to the present invention. Referring to FIG. 1, a divergent laser beam of elliptical cross-section emitted from a semiconductor laser device 1 is turned into a parallel beam by a collimating lens 2 of rotation symmetry configuration, and is then turned by a prism 3 into a parallel beam in which the beam intensity distribution in cross-section is circular, i.e. isotropic. The prism 3 is provided for turning the incident beam into a parallel beam of circular cross-section as described above. However, the optical element in the system for providing such a beam configuration is in no way limited to the prism, and at least one cylindrical lens can also be used for that purpose. Further, without the use of such a prism or a cylindrical lens, the numerical aperture of the collimating lens 2 may be suitably selected so that the collimating lens 2 can itself provide the parallel beam of circular cross-section. After passing through a beam splitter (a polarizing prism) 4, the parallel beam is converged by a focusing lens 5 of rotation symmetry configuration into a beam spot of diffraction limit which is incident upon a magneto-optical disc 6 including a recording film (a perpendicular magnetic thin film) 6a.

The magneto-optical disc 6 is adapted to be rotated by a drive motor (not shown). The magneto-optical disc 6 is comprised of a transparent substrate 6b, a recording film 6a and a protective layer 6c. The recording film 6a is in the form of a perpendicular magnetic thin film whose principal component is, for example, Tb-Te and which has a thickness of about 1,000 Å. The protective layer 6c covering the recording film 6a is formed of, for example, $SiO_2$ and has a thickness of about 1,400 Å. Further, spiral or concentric guide tracks (not shown) of phase structure acting as an optical guide for the beam spot may be provided on the recording film 6a with a pitch of, for example, 1.6 μm, when so required. One complete rotation of each guide track is divided into many sectors. Each of the individual sectors includes a header part and a data recording part. In the header part, contents required for management of information in the specific sector are provided in the form of, for example, a phase structure (concave and convex pits), as required and include the sector mark indicating the head of the specific sector, the synchronizing signal and the address such as the track number and the sector number used for the indentification of the specific sector. In the data recording part, information is recorded by mangetization. The header infqrmation may be provided in the guide tracks or on the flat area between the guide tracks. An electromangetic coil 7 is disposed opposite to the disc 6 for applying a recording and erasing magnetic field.

The convergent lens (focusing lens) 5 is mounted on a voice coil (not shown) so as to be moved to follow up vertical deflection of the disc 6. A mirror 12, such as, for example, a galvano-mirror is provided so that the beam spot can be shifted to follow up any eccentricity of the disc 6.

In the record mode recording information by magnetization, the drive current driving the semiconductor laser device 1 is modulated by an information signal to be recorded. The beam pulse signal corresponding to the information to be recorded is directed toward and onto the perpendicular magnetic thin film 6a of the disc 6 thereby locally raising the temperature of the perpendicular magnetic thin film 6a. As a result, the magnetization of the perpendicular magnetic thin film disappears locally. Then, a magnetic field whose direction is opposite to the direction of magnetization of the surrounding magnetized portion is applied from the electromagnetic coil 7 to the portion from which the magnetization has disappeared locally, so that a domain (a magnetization domain) having the magnetization of the opposite direction is formed in the irradiated portion only. The process of erasing information recorded or written already on the perpendicular magnetic thin film by magnetization includes supplying a constant current to the semiconductor laser device 1 to direct the laser beam toward and onto the perpendicular magnetic thin film 6a thereby causing the magnetization of the magnetic thin film to disappear once, and, then, applying a magnetic field of the direction opposite to the direction applied by the electromagnetic coil 7 in the record mode, thereby restoring the direction of magnatization of the perpendicular magnetic thin film to the same direction as that of the surrounding non-recorded area.

Information recorded on the perpendicular magnetic thin film is reproduced utilizing the magneto-optical effect represented by the Kerr effect. The Kerr effect is such that, depending on whether the direction of magnetization of the perpendicular magnetic thin film is upward or downward, the direction of polarization of the incident beam rotates slightly in opposite directions respectively. The beam reflected from the disc 6 passes through the convergent lens (focusing lens) 5 again and, after being split by the beam splitter 4 and then by another beam splitter 8, passed through an analyzer 9 to be reflected by a mirror 13. The beam reflected by the mirror 13 is guided through a lens 14 to a beam detector 10 which detects the magnetization information and the header signal. The analyzer 9 is an optical element which permits transmission of a specific polarized beam component only. The beam passed through the beam splitter 8 is guided to an optical system 11 which detects the control signals used for the automatic focusing and tracking control. For example, the beam passed through the beam splitter 8 is split into halves by another beam splitter 111. One of the split beams is guided through a spherical lens 112 to a half-split beam detector (two divided light detector) 113 which detects a tracking error signal, if any. The other beam passes through an astigmatic optical system composed of a spherical lens 114 and a cylindrical lens 115, and, after being partly shielded by a knife edge 116, is guided to another half-split beam detector (two divided light detector) 117 which detects a focusing error signal, if any. (Such a focusing signal detecting system is disclosed in, for example, U.S. Pat. No. 4,450,547.)

The differential output of the half-split beam detector (two divided light detector) 113 is detected by a tracking servo circuit (not shown), and the output of the tracking servo circuit is fed back to the mirror 12, which is a tracking actuator, for effecting the tracking control. On the other hand, the output of the half-split beam detector (two divided light detector) 117 is applied to an automatic focusing servo circuit (not shown), and the differential output of the automatic focusing servo circuit is fed back to the voice coil mounted on the convergent lens (focusing lens) 5, for effecting the focusing control. The header signal is also obtained from the sum output from the half-split beam detector (two divided light detector) 113. Various methods for detecting the tracking error and focusing error in the manner described above have been already known, and any one of the known methods is applicable to the optical head of the present invention. For example, the combination of a cylindrical lens and a quarter-split beam detector (four divided light detector), as disclosed in U.S. Pat. No. 4,293,944, may be used, so that the header signal, focusing signal and tracking signal can be detected by a single detection system.

Such an optical head is so arranged that it can be wholly or partly shifted to any desired radial position of the disc 6 by a carriage motor such as a linear motor.

Figure 2:
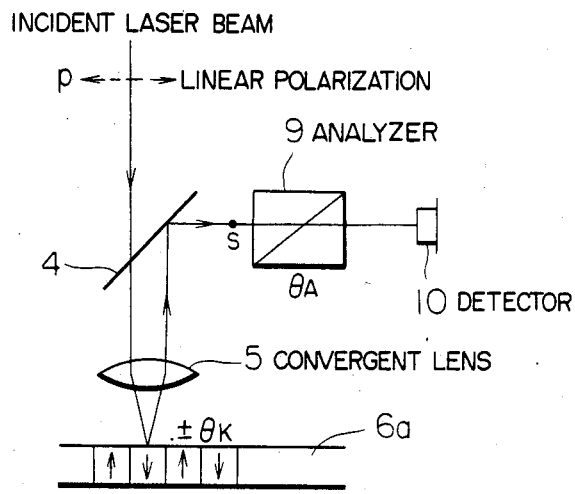
FIGS. 2 and 3 illustrate the basic principle of reproduction of information recorded on the perpendicular magnetic thin film by magnetization.

The basic principle of detection of magnetization information by such an optical head will now be described. FIG. 2 shows the principal parts extracted from FIG. 1. It is supposed that the laser beam emitted from the semiconductor laser device 1 is linearly polarized, and the irradiating laser beam passed through the polarization prism 4 is the P polarized beam polarized in the plane of the drawing sheet. The direction of polarization of the beam reflected from the perpendicular magnetic thin film 6a of the disc 6 is rotated by a Kerr rotation angle $\theta_K$ by the Kerr effect, and the polarized beam includes an S polarized beam component which is perpendicular to the plane of the drawing sheet. According to the Kerr effect, the direction of polarization of the beam rotates in opposite directions respectively depending on whether the direction of magnetization of the perpendicular magnetic thin film 6a is upward or downward. Therefore, when the beam reflected from the perpendicular magnetic thin film 6a is guided through the analyzer 9 to the beam detector 10, a change in the beam intensity is detected.

Figure 3:
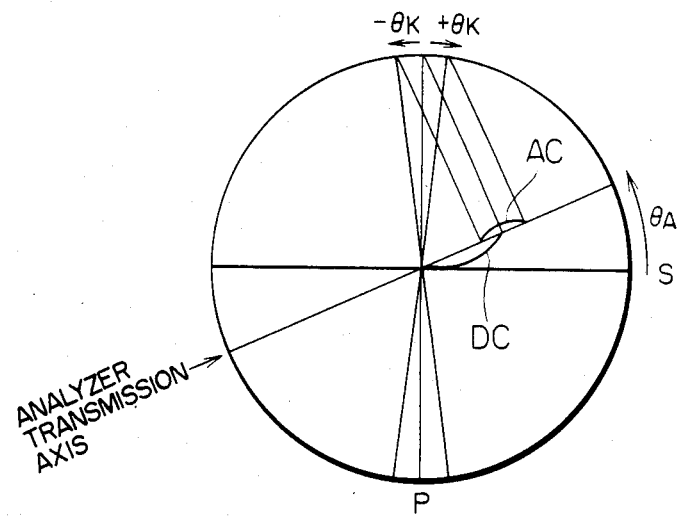

FIG. 3 illustrates how the rotation of the direction of polarization is converted into a relative magnitude of the beam intensity by the analyzer 9. In FIG. 3, $\theta_A$ designates the angle of rotation of the analyzer 9 from the extinction position S. The quantity of the beam transmitted through the analyzer 9 is given by the second power of the projected portion (the amplitude) of the electrical vector relative to the analyzer transmission axis. Therefore, the difference between the beams rotated through the Kerr rotation angles $+\theta_K$ and $-\theta_K$ in the opposite directions respectively, that is, the transmitted signal beam quantity S is given by the following expression:

$$S \propto \sin^2(\theta_A + \theta_K) - \sin^2(\theta_A - \theta_K) = \sin(2\theta_A) \cdot \sin(2\theta_K) = AC \tag{1}$$

On the other hand, it is supposed that noise attributable to the rotation of the disc 6 and proportional to the DC beam quantity after transmission through the analyzer 9 is dominant, and the intensity of noise is also dependent upon fluctuation of the laser beam intensity. Then, the noise quantity N is given by the following expression:

$$N \propto \sin^2\theta_A + (\text{extinction ratio})^{-1} = DC \tag{2}$$

where the (extinction ratio)$^{-1}$ represents the ratio of the component of the beam, which leaks out of the analyzer 9 even under the extinction condition of $\theta_A=0$, to the beam quantity transmitted through the analyzer 9 at $\theta_A = 90°$.

Figure 4:
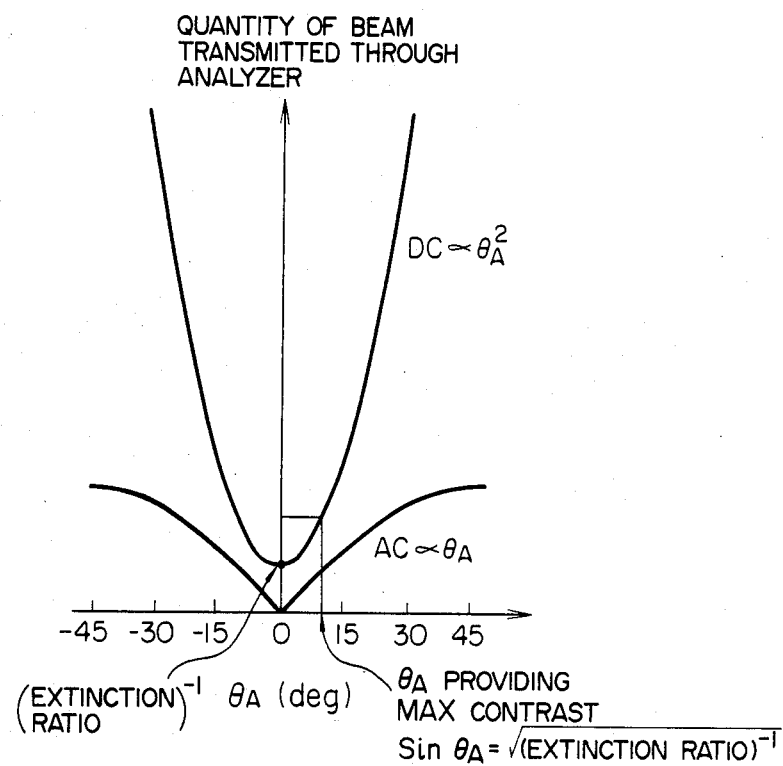
FIG. 4 is a graph illustrating the relation between the rotation angle $\theta_A$ of the analyzer and the quantity of the beam transmitted through the analyzer.

FIG. 4 is a graphic illustration of the expressions (1) and (2), and the horizontal axis represents the rotation angle $\theta_A$. The S/N ratio becomes maximum when $\theta_A$ is selected to provide a largest AC/DC ratio, that is, a maximum contrast. From the expressions (1) and (2), the following equation is obtained:

$$\frac{AC}{DC} = \frac{\sin(2\theta_A) \cdot \sin(2\theta_K)}{\sin^2\theta_A + (\text{extinction ratio})^{-1}} \qquad (3)$$

$$\frac{d}{d\theta_A}\left(\frac{AC}{DC}\right) = 0$$

On the basis of the equation (3), the value of $\theta_A$ which provides a maximum AC/DC ratio is calculated, as follows:

$$\theta_A = \sin^{-1}\sqrt{(\text{extinction ratio})^{-1}} \qquad (4)$$

Figure 5:
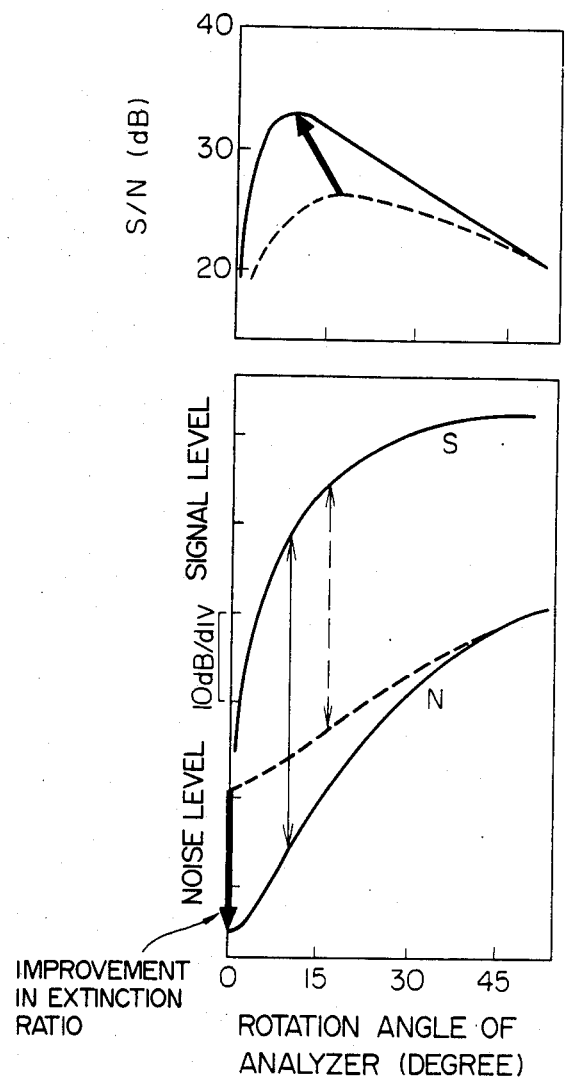
FIG. 5 is a graph illustrating the relation between the extincition ratio and the S/N ratio.

FIG. 5 is a graphic illustration of the dependence of the S/N ratio on the value of $\theta_A$ when the signal S and the noise N are logarithmically expressed. FIG. 5 illustrates two cases of respectively different extinction ratios. It will be seen that the larger the extinction ratio and the smaller the (extinction ratio)$^{-1}$, the better is the S/N ratio. This is achieved when the direction of polarization of the incident polarized beam coincides with the optical anisotropic axis of the convergent lens (focusing lens) 5. When the direction of polarization of the incident polarized beam does not coincide with the optical anisotropic axis of the convergent lens (focusing lens) 5, the noise level rises, resulting in a lowered S/N ratio. It can be seen that the value of $\theta_A$ providing the maximum S/N ratio becomes small.

As described above, the extinction ratio of the optical head is an important factor for determining the S/N ratio. Selection of a good extinction ratio contributes to the improvement of the S/N ratio. The fact that the extinction ratio is determined by the optical anisotropy of the convergent lens (focusing lens) 5 will be proved on the basis of experimental date.

Figure 6:
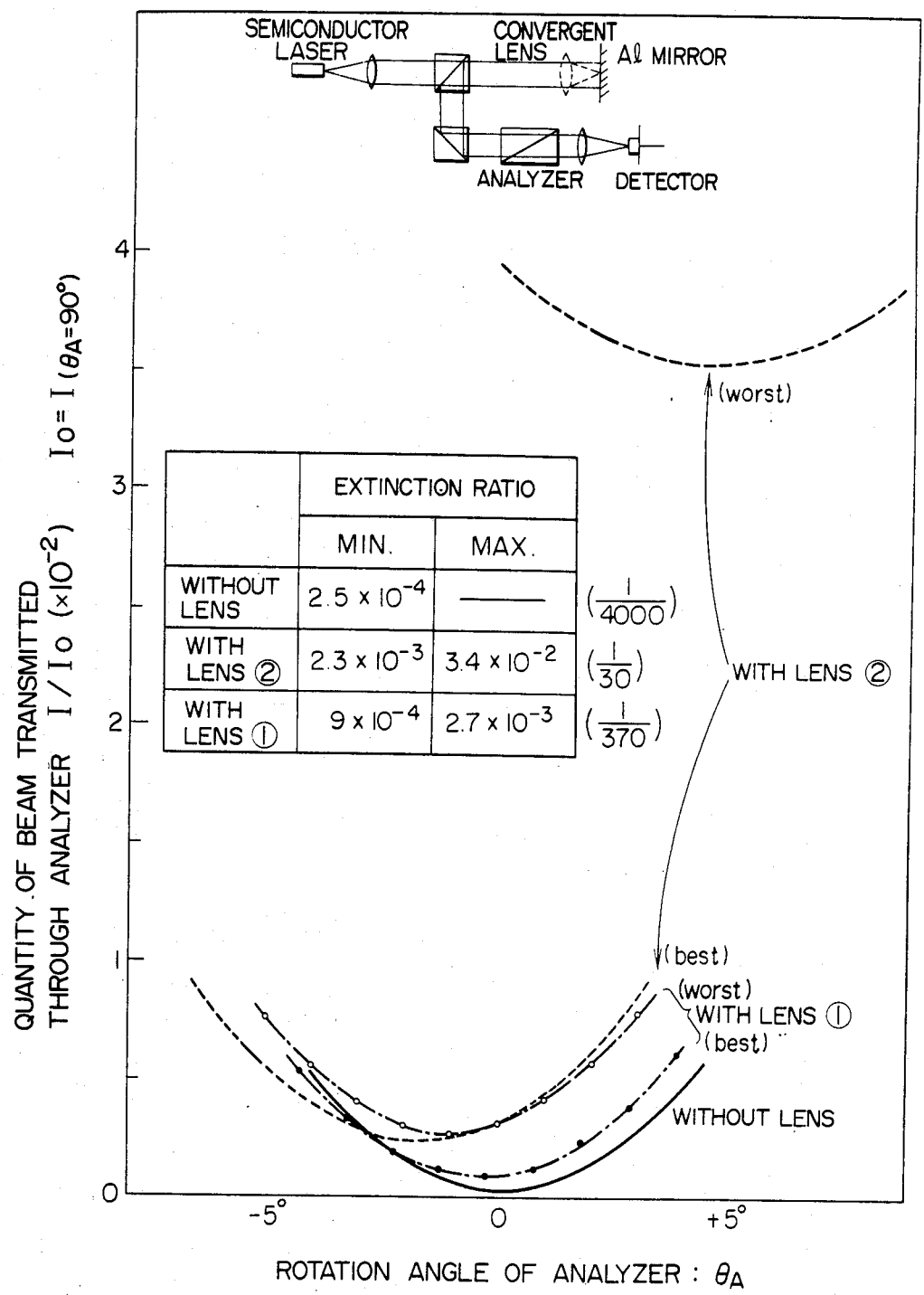
FIG. 6 is a graph illustrating the relation between the convergent lens (focusing lens) and the extinction ratio.

FIG. 6 shows data obtained as a result of evaluation of the extinction ratio on the illustrated measuring system. In FIG. 6, the horizontal axis represents the rotation angle $\theta_A$ of the analyzer, and the vertical axis represents the value obtained by dividing the beam quantity I, transmitted through the analyzer, by the beam quantity Io observed at $\theta_A = 90°$. When the focusing lens as shown by the dotted lines is not present, the value of I/Io is minimum at $\theta_A = 0$. When, on the other hand, the focusing lens is inserted in the optical system, the minimum value of I/Io increases, and the value of $\theta_A$ having the minimum value of I/Io is not zero. Further, rotation of the focusing lens around the optical axis changes the extinction ratio. Thus, insertion of the focusing lens in the optical system leads to a worse extinction ratio, and the degree of worsening of the extinction ratio is dependent on whether the focusing lens is perfectly finished or not and dependent also on the angular position of rotation of the lens around the optical axis. FIG. 6 shows the results of measurement using two different focusing lenses.

Figure 7:
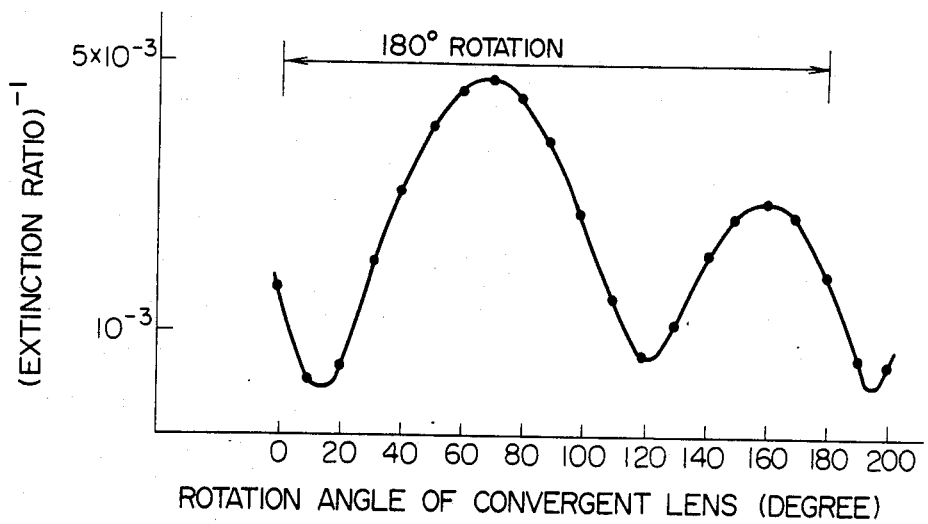
FIG. 7 is a graph showing an example of the relation between the rotation angle of the focusing lens and the extinction ratio.

FIG. 7 is a graph in which the rotation angle of a certain focusing lens around the optical axis is plotted on the horizontal axis, and the (extinction ratio)$^{-1}$ is plotted on the vertical axis. It will be seen that rotation of the lens changes the value of the (extinction ratio)$^{-1}$.

The result of checking on the state of polarization of the beam having transmitted through the convergent lens (focusing lens) proves that the beam is no more linearly polarized but is elliptically polarized due to rotation of the major axis. This indicates that the focusing lens functions as a phase plate and that, even when a lens of rotation symmetry configuration is used as the focusing lens, the lens is actually not circularly symmetrical and has an optical anisotropy. This optical anisotropy of the lens is considered to be attributable to, for example, distortion of the glass body forming the lens and misalignment of the lens axis during assembling.

It will be seen in FIG. 7 that the (extinction ratio)$^{-1}$ changes with the period of 180° in terms of the rotation angle of the focusing lens. It will also be seen that the (extinction ratio)$^{-1}$ takes its minimum value with the period of about 90°. That is, the beam transmitted through the focusing lens advances in a state in which it is divided into a phase advance axis component and a phase lag axis component which are two oscillation components substantially orthogonal to each other, and, with the rotation of the focusing lens, the (extinction ratio)$^{-1}$ becomes minimum when coincidence is reached between the phase advance axis or phase lag axis of the lens and the direction of linear polarization of the incident laser beam. In the case of the example shown in FIG. 7, coincidence is reached between the major axis (the phase advance axis or phase lag axis) of optical anisotropy of the focusing lens and the direction of linear polarization of the incident laser beam in the vicinity of about 20° or 120°. When the rotation angle of the lens is set at a value displaced by about 45° from the value of 20° or 120° described above, the optical anisotropy of the lens becomes most predominant, resulting in an excessively large value of the (extinction ratio)$^{-1}$. Therefore, an optical head having a small value of the (extinction ratio)$^{-1}$ is obtained when the major axis (the phase advance axis or phase lag axis) of optical anisotropy of the focusing lens is selected to substantially coincide with the direction of linear polarization of the incident laser beam, and information recorded by magnetization can be reproduced with a high S/N ratio.

The optical anisotropy of the collimating lens 2 need not be strictly specified. This is because the beam splitter 4 reflects almost 100% of the S polarized beam and permits transmission of about 50% of the P polarized beam only, and the transmission of the linearly polarized beam through the beam splitter 4 improves the P:S ratio of the linearly polarized beam.

In the embodiment described above, the focusing lens 5 is rotated around the center of the optical axis of the optical system to attain coincidence between the major axis of optical anisotropy of the lens and the direction of linear polarization of the incident laser beam. However, the coincidence therebetween can also be attained by rotating the direction of linear polarization of the incident laser beam. In such a modification, a $\lambda/2$ plate 20 (where $\lambda$ is the wavelength) as shown by dotted lines in FIG. 1 is interposed between the beam splitter 4 and the focusing lens 5. This $\lambda/2$ plate 20 is rotated around the center of the optical axis of the optical system to cause rotation of the direction of linear polarization of the laser beam incident upon the focusing lens 5 until the direction of linear polarization of the incident laser beam coincides substantially with the major axis of optical anisotropy of the convergent lens 5. The direction of linear polarization of the linearly polarized beam transmitted through the beam splitter 4 is caused to coincide with the major axis of optical anisotropy of the focusing lens 5 by the function of the λ/2 plate 20, and such a laser beam is focused by the focusing lens 5 onto the disc 6 as a beam spot. The beam reflected from the disc 6 passes through the focusing lens 5 and λ/2 plate 20 again and is then reflected by the polarized beam splitter 4. After being then reflected by the polarized beam splitter 8, the beam is guided through the analyzer 9 to the beam detector 10.

Figure 8:
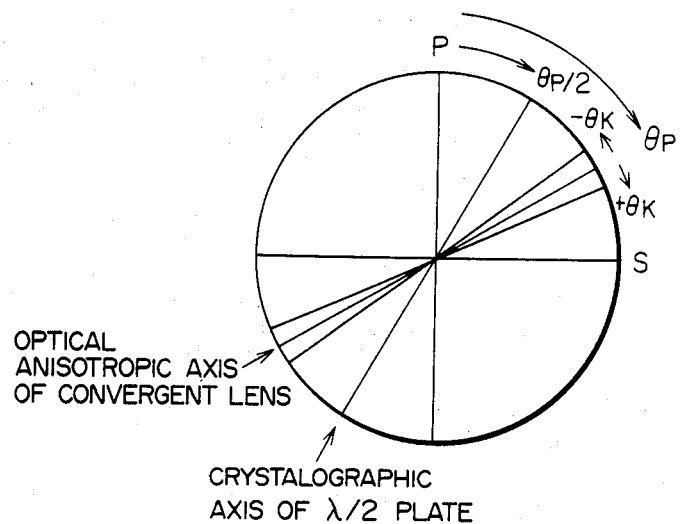
FIG. 8 illustrates the basic principle of reproduction of information recorded by magnetization, when a $\lambda/2$ plate is provided.

FIG. 8 illustrates the state of polarization when the laser beam, whose direction of linear polarization P is caused to coincide with the optical anisotropic axis of the convergent lens (focusing lens) 5 by the function of the λ/2 plate 20, is reflected from the disc 6.

The direction of linear polarization of the laser beam transmitted through the polarized beam splitter 4 in FIG. 1 corresponds to P shown in FIG. 8. Suppose that the optical anisotropic axis (the phase advance axis or phase lag axis) of the focusing lens 5 makes an angle of $\theta_P$ with the direction of linear polarization P. Then, when the crystallographic axis of the λ/2 plate 20 is selected to make an angle of $\theta_P/2$ with the direction of polarization P, coincidence is reached between the direction of linear polarization of the incident laser beam and the optical anisotropic axis of the lens 5, and such a laser beam is focused by the lens 5 to form a beam spot on the disc 6. The direction of polarization of the linearly polarized beam reflected from the disc 6 rotates by $\pm \theta_K$ around the optical anisotropic axis of the focusing lens 5 depending on the direction of magnetization of the perpendicular magnetic thin film 6a of the disc 6.

When the beam reflected from the disc 6 passes through the λ/2 plate 20 again, the direction of polarization inclined by $\theta_P$ in FIG. 8 coincides with the original direction of polarization P again, and the rotation angles $\pm \theta_K$ of the direction of polarization corresponding to the magnetization of the perpendicular magnetic thin film 6a are maintained around the direction of polarization P. The beam in such a polarized state is incident upon the analyzer 9. Therefore, as described already with reference to FIG. 3, the rotation of the direction of polarization is converted into a relative magnitude of the beam intensity by the beam analyzer 9.

Figure 9:
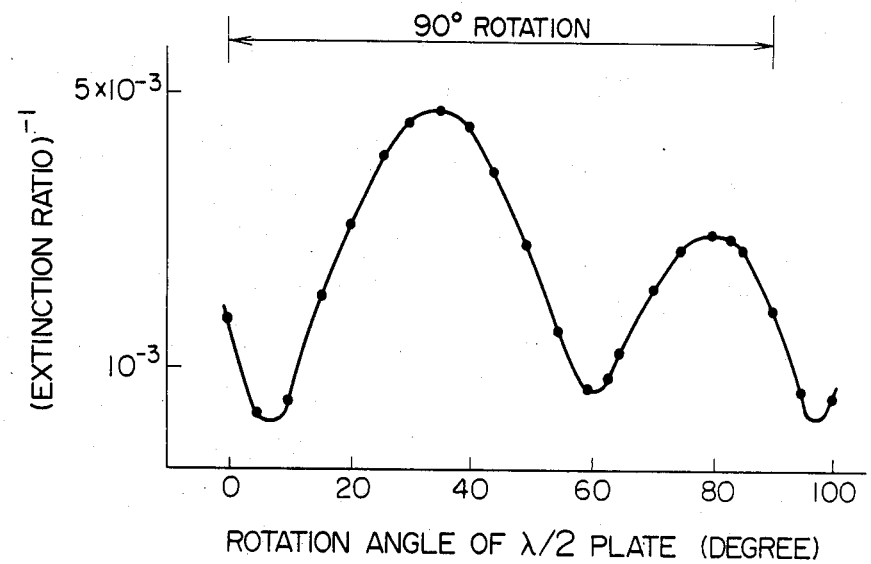
FIG. 9 is a graph showing an example of the relation between the rotation angle of the $\lambda/2$ plate and the extinction ratio.

FIG. 9 is a graph in which the rotation angle of the λ/2 plate 20 around the optical axis is plotted on the horizontal axis, and the (extinction ratio)$^{-1}$ is plotted on the vertical axis. It will be seen that the rotation of the λ/2 plate 20 changes the value of the (extinction ratio)$^{-1}$, as in the case of FIG. 7. That is, the (extinction ratio)$^{-1}$ changes with the period of about 90° in terms of the rotation angle of the λ/2 plate 20, and becomes minimum with the period of about 45°. Therefore, when the λ/2 plate 20 is so disposed as to make an angle of, for example, about 10° with the direction of linear polarization of the laser beam emitted from the simiconductor laser device 1 and passed through the beam splitter 4, in the case of the example shown in FIG. 9, coincidence is substantially reached between the direction of linear polarization of the laser beam incident upon the focusing lens 5 and the major axis (the phase advance axis or phase lag axis) of optical anisotropy of the focusing lens 5. Thus, an optical head showing a small value of the (extinction ratio)$^{-1}$ can be obtained, and information recorded by magnetization can be reproduced with a high S/N ratio.

What is claimed is:

1. An optical head for a magneto-optical memory, comprising a laser beam source emitting a linearly polarized laser beam, a beam splitter transmitting the laser beam, a focusing lens focusing the laser beam transmitted through said beam splitter onto a recording medium recording information according to the direction of magnetization, and a detecting system detecting the direction of polarization of the laser beam which is reflected from said recording medium, transmitted through said lens and reflected by said beam splitter, and positioning means for enabling the major axis of optical anisotropy of said lens to coincide substantially with the direction of linear polarization of the laser beam incident upon said lens, whereby the extinction ratio of the optical head is improved.

2. An optical head as claimed in claim 1, wherein an optical element interposed between said beam splitter and said lens and positioned so that the direction of linear polarization of the laser beam transmitted through said beam splitter to be incident upon said lens coincides substantially with the major axis of optical anisotropy of said lens.

3. An optical head as claimed in claim 2, wherein said optical element is λ/2 plate, where λ is the wavelength.

4. An optical head as claimed in claim 1, wherein said detecting system includes an analyzer extracting a predetermined polarized beam component from the laser beam reflected by said beam splitter, and a beam detector converting the laser beam from said analyzer into an electrical signal.

5. An optical head as claimed in claim 2, wherein said detecting system includes an analyzer extracting a predetermined polarized beam component from the laser beam reflected by said beam splitter, and a beam detector converting the laser beam from said analyzer into an electrical signal.

6. An optical head as claimed in claim 1, further comprising a second beam splitter splitting the laser beam reflected by said first beam splitter, the laser beam reflected by said second beam splitter being guided toward said detecting system, and a control signal detecting system receiving the laser beam transmitted through said second beam splitter to generate an electrical signal for detecting a control signal controlling the irradiating position of the laser beam on said recording medium.

7. An optical head as claimed in claim 2, further comprising a second beam splitter splitting the laser beam reflected by said first beam splitter, the laser beam reflected by said second beam splitter being guided toward said detecting system, and a control signal detecting system receiving the laser beam transmitted through said second beam splitter to generate an electrical signal for detecting a control signal controlling the irradiating position of the laser beam on said recording medium.

8. An optical head as claimed in claim 1, wherein said laser beam source is a semiconductor laser device, and a laser-beam shaping optical system is provided so that the laser beam from said semiconductor laser device is turned into a parallel beam having a substantially circular cross-section.

9. An optical head as claimed in claim 2, wherein said laser beam source is a semiconductor laser device, and a laser-beam shaping optical system is provided so that the laser beam from said semiconductor laser device is turned into a parallel beam having a substantially circular cross-section.

10. An optical head as claimed in claim 1, wherein said positioning means effects the rotational dispostion of said lens so that the major axis of optical anisotropy of said lens substantially coincides with the direction of linear polarization of the laser beam incident upon said lens.

* * * * *